(No Model.) 2 Sheets—Sheet 1.

D. R. PRUDEN.
OPTOMETER.

No. 430,591. Patented June 17, 1890.

WITNESSES.
R. Henry Marsh.
H. B. Saunders.

INVENTOR.
Daniel R. Pruden
by A. H. Newell,
attorney (No Model.)  2 Sheets—Sheet 2.

D. R. PRUDEN.
OPTOMETER.

No. 430,591.  Patented June 17, 1890.

WITNESSES.
R. Henry Marsh.
H. B. Saunders.

INVENTOR.
Daniel R. Pruden
by A. H. Spencer,
Attorney.

UNITED STATES PATENT OFFICE.

DANIEL R. PRUDEN, OF CHELSEA, MASSACHUSETTS, ASSIGNOR TO DANIEL W. WORMWOOD, OF SAME PLACE.

OPTOMETER.

SPECIFICATION forming part of Letters Patent No. 430,591, dated June 17, 1890.

Application filed September 16, 1889. Serial No. 324,147. (No model.)

*To all whom it may concern:*

Be it known that I, DANIEL R. PRUDEN, of Chelsea, in the county of Suffolk and State of Massachusetts, have invented certain new and useful Improvements in Optometers, of which the following, taken in connection with the accompanying drawings, is a specification.

The object of this invention is to furnish for opticians and occulists an improved instrument or apparatus for conveniently holding a series of lenses which may be brought successively into position before the eye and between the eye-piece and a fixed or adjustable object-support connected thereto.

Heretofore lenses have been mounted in the edges of rotating disks to come successively before the eye, two such disks being provided, one for each eye; but such apparatus (when furnishing a complete series of lenses of the various powers) is too bulky and expensive for ordinary use, and is otherwise objectionable.

I disclaim any instrument having the lenses fixed in a rotating disk or disks.

With my improvement a series of independent lens-holders are placed in a race or connected in a chain, so as to be moved successively before the eye-pieces as the observer looks through the lenses placed in the lens-holders. A suitable frame incloses the lens-holders, and an opening below and between them admits the lower face, thus bringing the eye up to the eye-pieces.

The features peculiar to my device are hereinafter described, and are particularly referred to in the appended claims.

Figure 1:
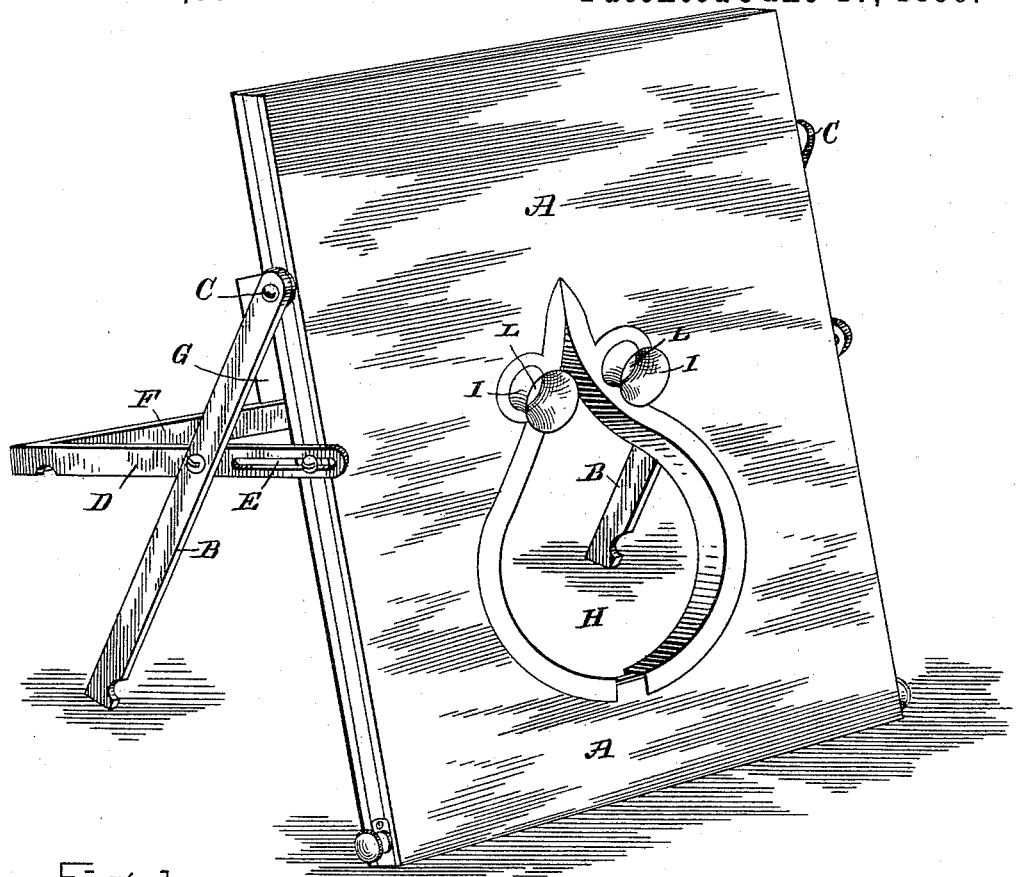
Figure 2:
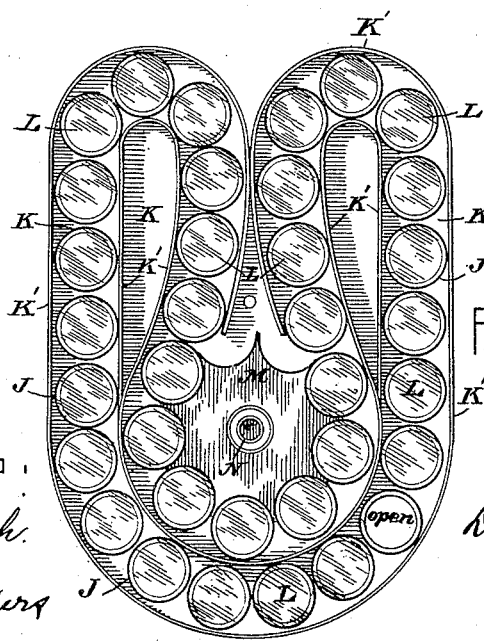
Figure 3:
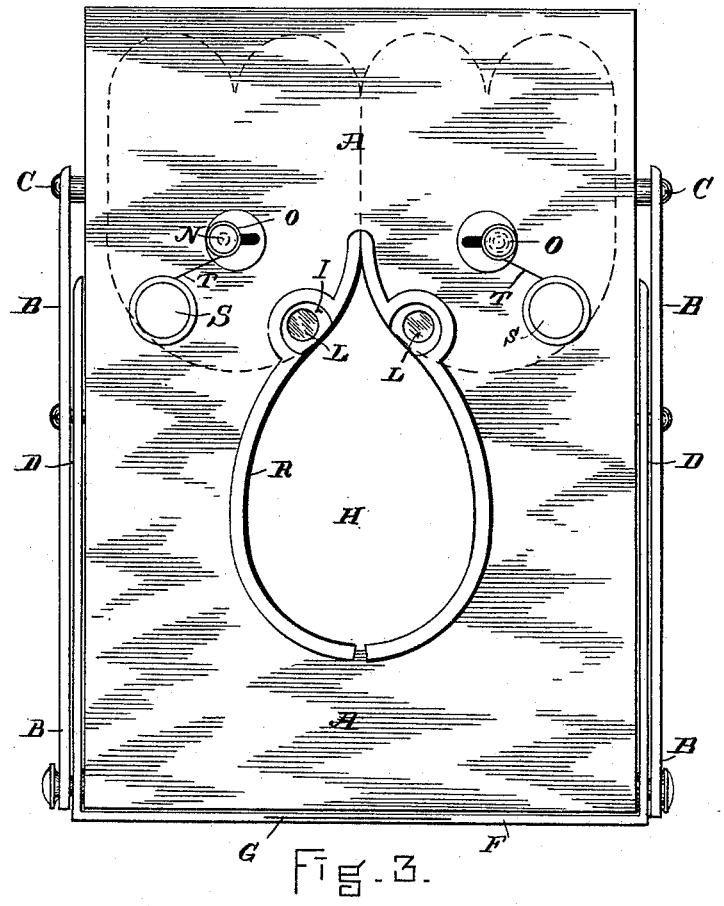
Figure 4:
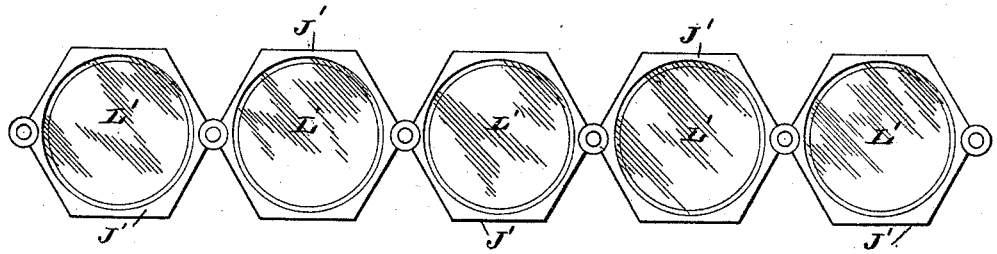
Figure 5:

In the drawings, Figure 1 is a perspective view showing the front and side of one form in which my apparatus has been embodied. Fig. 3 is a rear view of the same, the braces or supports being folded. Fig. 2 represents a succession of annular lens-holders placed in a curved raceway of desirable form, with a driving-disk or flat wheel surrounded by said races and having in its periphery curved recesses with intermediate prongs fitting the sides of and projecting between said holders, so as to propel them when the wheel is rotated, the whole being adapted to be placed between the front and rear surfaces of the frame or upright. Fig. 4 shows some of the lenses placed in holders which are connected in a chain by loose pivots, which enable the whole series to move together within the frame or otherwise without being confined within the walls of the race. Fig. 5 is a transverse section through a lens and its holder.

The frame A, of any suitable form and material, is shown furnished with two folding legs B, pivoted at C to the edges of the frame and provided with transverse braces D, pivoted to the legs and having a slot E, and pin-connection with the edge of the frame, permitting a folding movement, as in Fig. 3, without disconnecting. The braces D are connected at their free ends by the cross-bar F, which has a narrow vertical slot in it and serves as a support for the card G or other object to be viewed. This construction may be modified as occasion requires.

H represents a large opening through the frame for the nose and lower face of the patient, and I I the two eye-pieces, to which the several lenses L are successively brought, in order to select those best suited to the eyes of the observer.

Each instrument has one or more distinct series of the sample lenses placed in the annular lens-holders J in any proper order and following each other, as in the raceway K, Fig. 2, or the chain, Fig. 4, each eye-piece covering a convenient point in the race or chain, and each series having an independent propelling means, causing all the lenses of that series to pass before the eye-piece. The race may be cast, molded, died, or milled out, but is preferably formed between two flat sheet-metal plates, on one of which the walls or sides of the channel are erected and secured by bending narrow strips K', of brass, into the desired form and soldering or brazing them permanently in place with just sufficient space for movement of the rings J in succession. A flat plate over all keeps the rings or holders from getting out of position. A box or case of this general form is placed within each upper quarter of the frame, as indicated by dotted lines, Fig. 3, a hole being formed through the front and back plate at the point where the eye-piece is located, so that each lens of that series must pass before it.

In Fig. 2 the wheel M is seen recessed in its periphery and with projecting prongs engaging the rings J to move them forward when the shaft N is rotated at will by the operator turning the knob O, Fig. 3.

The lenses, placed loosely in the flanged rings J, are protected from surface-wear, which would otherwise arise from friction upon the walls of the race, and also from abrasion or chipping, due to their edgewise contact with each other and with the actuating-wheel, and all danger of their overlapping and clogging in the race is avoided.

The eye-pieces may be somewhat varied in their distances from each other by suitable means. They are shown attached to the flanged margins R of the face-opening H, and these may be moved laterally by a screw-rod or other device, carrying with them one or both of the series of lenses in the races K K'. Slots are represented in Fig. 3 for this lateral movement of the shafts N with each lens-holding case.

The series of lenses placed in the sinuous races K K' will ordinarily include samples of the various numbers, both concave and convex glasses. It is sometimes desirable to introduce, additionally, a series of cylindricals. In such case I prefer to superpose the additional set, properly inclosed and actuated, upon the box which incloses the first set or series and in position to pass before the eye-piece L. I omit the lens L from one of the lens-holders J of the first series, leaving an open ring at that point, through which the lenses of the superposed series can be examined. By leaving open one of the holders of this series and bringing the open ring to the eye-piece the lenses of the first series may again be seen. So, too, the operator may combine a cylindrical with a concave or convex lens by bringing both into position simultaneously.

The lenses in the holders are samples, and are known by certain numbers. I combine with the lens-holding and actuating devices an indicator, showing at a glance what lens is in position. Fig. 3 shows suitable apparatus. A flexible tape T, numbered on one of its sides to correspond with the numbers of the successive lenses, is secured to and wound upon the shaft N, by rotation of which it is drawn out from the spring-box S.

I claim as my invention—

1. In an optometer or eye-testing apparatus, a suitable frame or case having eye-pieces and inclosed channels or races leading to such eye-pieces, in combination with a series of annular disconnected lens-holders fitting edge to edge loosely within said channels and carrying a succession of lenses past the eye-pieces without contact with the walls of such channels, and with a peripherally-recessed wheel for causing said lenses and holders to traverse the channel, for the purpose set forth.

2. In an optometer, a suitable inclosing-frame having a face-opening H and eye-pieces I, adjacent thereto, in combination with a succession of independent annular lens-holders movable in a recess within such frame, means for actuating such holders and the lenses therein, and a suitable indicator to designate the number of each lens, for the purpose set forth.

In testimony whereof I have signed my name to this specification, in the presence of two subscribing witnesses, on this 21st day of August, A. D. 1889.

DANIEL R. PRUDEN.

Witnesses:
A. H. SPENCER,
D. W. WORMWOOD.